United States Patent
Mori et al.

(10) Patent No.: US 9,004,250 B2
(45) Date of Patent: Apr. 14, 2015

(54) DOG CLUTCH FOR AUTOMATED TRANSMISSION

(71) Applicant: Aisin Seiki Kabushiki Kaisha, Kariya-shi (JP)

(72) Inventors: Kyosuke Mori, Kariya (JP); Yasuhisa Iwasaki, Ichinomiya (JP); Masahiro Yoshida, Toyota (JP); Tomonori Tada, Chiryu (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 132 days.

(21) Appl. No.: 13/782,210

(22) Filed: Mar. 1, 2013

(65) Prior Publication Data
US 2013/0240317 A1     Sep. 19, 2013

(30) Foreign Application Priority Data

Mar. 14, 2012 (JP) .................................. 2012-057564
Dec. 26, 2012 (JP) .................................. 2012-283232

(51) Int. Cl.
| F16D 11/14 | (2006.01) |
| F16D 11/10 | (2006.01) |
| F16D 11/00 | (2006.01) |

(52) U.S. Cl.
CPC ................ F16D 11/14 (2013.01); F16D 11/10 (2013.01); *F16D 2011/002* (2013.01); *F16D 2011/008* (2013.01)

(58) Field of Classification Search
CPC .................... F16D 2011/002; F16D 2011/008; F16D 11/00
USPC .............................. 192/69.7, 69.83, 69.9, 108
See application file for complete search history.

(56) References Cited

U.S. PATENT DOCUMENTS

| 6,370,979 B1 * | 4/2002 | Tauschek et al. ............. 192/108 |
| 8,151,962 B2 * | 4/2012 | Kumagai et al. ............. 192/69.9 |

(Continued)

FOREIGN PATENT DOCUMENTS

| FR | 2 887 604 A | 12/2006 |
| GB | 2 289 095 A | 11/1995 |
| JP | 2002-139146 | 5/2002 |
| JP | 2010-96190 | 4/2010 |
| JP | 2011-112114 | 6/2011 |

OTHER PUBLICATIONS

Extended European Search Report issued Jun. 28, 2013 in Patent Application No. 13158068.0.

(Continued)

*Primary Examiner* — Rodney H Bonck
(74) *Attorney, Agent, or Firm* — Oblon, McClelland, Maier & Neustadt, L.L.P.

(57) ABSTRACT

A dog clutch for an automated transmission includes a rotary shaft, a clutch ring, a hub, a sleeve including a spline that includes a plurality of first teeth and second teeth, a whole depth of each of the first teeth being greater than a whole depth of each of the second teeth, a dog clutch portion including clutch forward teeth, the teeth number of clutch forward teeth being equal to the teeth number of first teeth, each of the clutch forward teeth being formed at a position facing each of the first teeth to extend from a front end surface to a rear end position of the dog clutch portion, the dog clutch portion including clutch rearward teeth engageable with tooth grooves formed at the spline and formed to extend from a position retracted by a first predetermined distance from the front end surface to the rear end position.

4 Claims, 10 Drawing Sheets

(56) References Cited

U.S. PATENT DOCUMENTS

2004/0104092 A1* 6/2004 Nakai .................... 192/69.9
2006/0027434 A1* 2/2006 Capito .................. 192/69.83
2013/0240318 A1* 9/2013 Mori et al. ............... 192/69.9

OTHER PUBLICATIONS

U.S. Appl. No. 13/782,070, filed Mar. 1, 2013, Mori, et al.
U.S. Appl. No. 14/169,440, filed Jan. 31, 2014, Nakamura, et al.
U.S. Appl. No. 14/168,127, filed Jan. 30, 2014, Mori, et al.

* cited by examiner

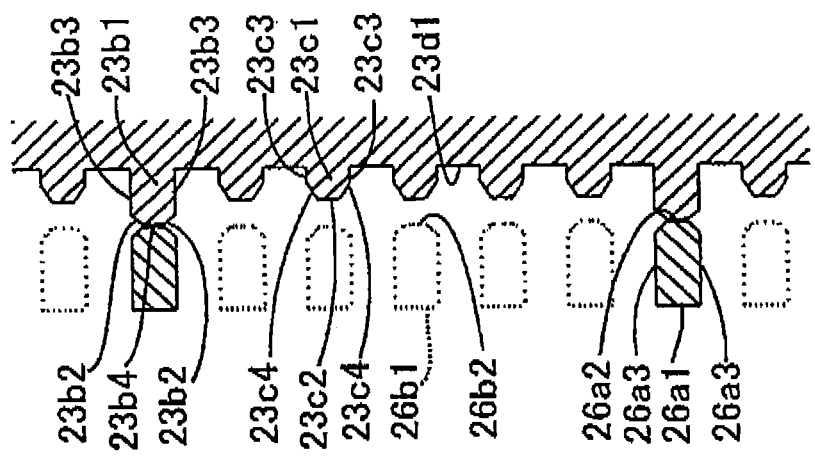
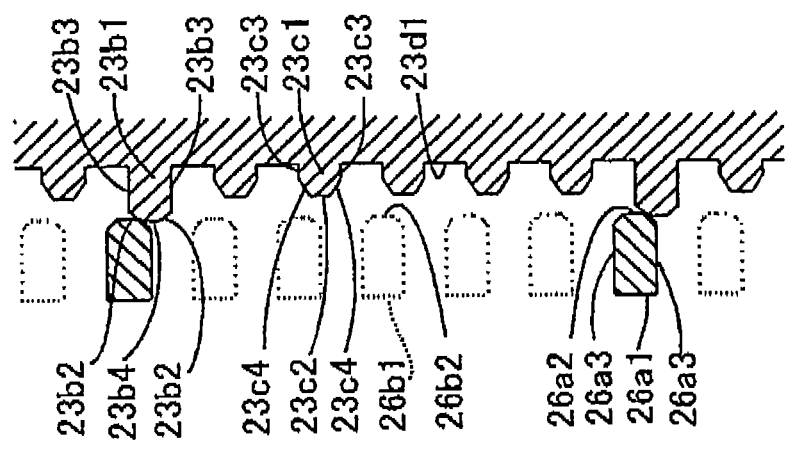
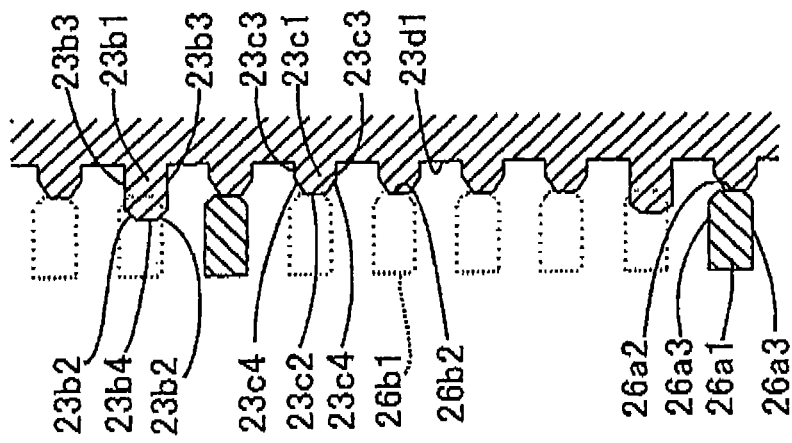

US 9,004,250 B2

DOG CLUTCH FOR AUTOMATED TRANSMISSION

CROSS REFERENCE TO RELATED APPLICATIONS

This application is based on and claims priority under 35 U.S.C. §119 to Japanese Patent Applications 2012-057564, filed on Mar. 14, 2012, and 2012-283232, filed on Dec. 26, 2012, the entire contents of which are incorporated herein by reference.

TECHNICAL FIELD

This disclosure generally relates to a dog clutch for an automated transmission applied to a vehicle.

BACKGROUND DISCUSSION

A transmission disclosed in JP2002-139146A, which will be hereinafter referred to as Reference 1, includes a synchromesh mechanism in which a sleeve is slid in an axial direction so that the sleeve is spline-connected to a clutch ring while rotations of the sleeve and the clutch ring are synchronized with each other. As a result, a desired gear range is achieved. A shift actuator including a rotation motor and a gear mechanism is used as a driving source of the synchromesh mechanism.

A clutch apparatus disclosed in JP2010-96190A, which will be hereinafter referred to as Reference 2, includes a dog clutch mechanism in which a sleeve and a clutch ring are provided. High teeth and short teeth are formed at an inner periphery of the sleeve in a state where a radial height of each high tooth and a radial length of each short tooth are different from each other. Clutch forward teeth and clutch rearward teeth are formed at an outer periphery of a protrusion portion of the clutch ring. The number of clutch forward teeth is smaller than the number of clutch rearward teeth. In addition, the clutch forward teeth and the clutch rearward teeth are displaced one another in an axial direction. The height of each clutch forward tooth, i.e., a radial length of the clutch forward tooth, is defined so that the clutch forward teeth engage with the high teeth but not to engage with the short teeth of the sleeve. The height of each clutch rearward tooth, i.e., a radial length of the clutch rearward tooth, is defined so that the clutch rearward teeth engage with the short teeth of the sleeve. Then, a clutch groove for the high teeth, which will be hereinafter referred to as a high tooth clutch groove, is formed between the clutch forward tooth and the clutch rearward tooth so that the high tooth of the sleeve is engageable with the high tooth clutch groove. In the same way, a clutch groove for the short teeth, which will be hereinafter referred to as a short tooth clutch groove, is formed between the clutch rearward teeth adjacent to each other so that the short tooth of the sleeve is engageable with the short tooth clutch groove.

In a case where the sleeve is slid in the axial direction, the high tooth makes contact with an end surface of the clutch forward tooth, and thereafter enters between the clutch forward teeth to make contact with a side surface of the clutch rearward tooth. As a result, a phase adjustment is completed. The sleeve is then further slid in the axial direction so that the high tooth engages with the high tooth clutch groove while the short tooth engages with the short tooth clutch groove. As a result, the sleeve and the clutch ring are completely in engagement with each other.

According to the synchromesh mechanism disclosed in Reference 1, a pressing friction force is used, which leads to a high output of the shift actuator. In addition, because the gear mechanism is used for the shift actuator, a breakage of a gear, for example, is caused by an impact at a shifting operation. Further, a drag may occur in a case where the synchromesh mechanism is not operated, which may be a cause of power loss and deterioration of fuel economy.

According to the dog clutch mechanism disclosed in Reference 2, an issue caused by the synchromesh mechanism does not occur, Nevertheless, the short tooth clutch groove is formed so that the short tooth is engageable with the short tooth clutch groove but the high tooth is inhibited from engaging with the short tooth clutch groove. Therefore, until the high tooth reaches the high tooth clutch groove and the rotations of the sleeve and the clutch ring are completely synchronized with each other, the sleeve and the clutch ring are inhibited from being completely in engagement with each other. As a result, a shifting time may be elongated.

A need thus exists for a dog clutch for an automated transmission which is not susceptible to the drawback mentioned above.

SUMMARY

According to an aspect of this disclosure, a dog clutch for an automated transmission includes a rotary shaft rotatably connecting to one of an input shaft and an output shaft of the automated transmission and provided rotatably about an axial line, a clutch ring rotatably supported by the rotary shaft and rotatably connecting to the other of the input shaft and the output shaft, a hub fixed to the rotary shaft and arranged adjacent to the clutch ring, a sleeve slidably engaging with the hub in a direction of the axial line, the sleeve including a spline, the spline including a plurality of first teeth and a plurality of second teeth, a whole depth of each of the first teeth being greater than a whole depth of each of the second teeth, an axial driving device moving the sleeve in the direction of the axial line, and a dog clutch portion provided at the clutch ring to project towards the sleeve, the dog clutch portion selectively engaging and disengaging relative to the spline formed at the sleeve when the sleeve moves in the direction of the axial line. The dog clutch portion includes clutch forward teeth of which an outer diameter is greater than an inner diameter of the first teeth and smaller than an inner diameter of the second teeth, the teeth number of clutch forward teeth being equal to the teeth number of first teeth, each of the clutch forward teeth being formed at a position facing each of the first teeth to extend from a front end surface of the dog clutch portion to a rear end position of the dog clutch portion, the dog clutch portion including clutch rearward teeth engageable with tooth grooves formed at the spline and formed to extend from a position retracted by a first predetermined distance from the front end surface of the dog clutch portion to the rear end position of the dog clutch portion.

BRIEF DESCRIPTION OF THE DRAWINGS

The foregoing and additional features and characteristics of this disclosure will become more apparent from the following detailed description considered with the reference to the accompanying drawings, wherein:

FIG. 10A is a diagram explaining a partial operation of the dog clutch and illustrating a state in which the high tooth engages with the clutch forward tooth;

FIG. 10B is a diagram explaining the partial operation of the dog clutch and illustrating a state in which the high tooth makes contact with an inclined surface of the clutch forward tooth;

FIG. 10C is a diagram explaining the partial operation of the dog clutch and illustrating a state in which the high tooth and the short tooth make contact with contact surfaces of the respective clutch rearward teeth;

DETAILED DESCRIPTION

An embodiment of a dog clutch for an automated transmission mounted to a vehicle will be explained with reference to the attached drawings.

Figure 1:
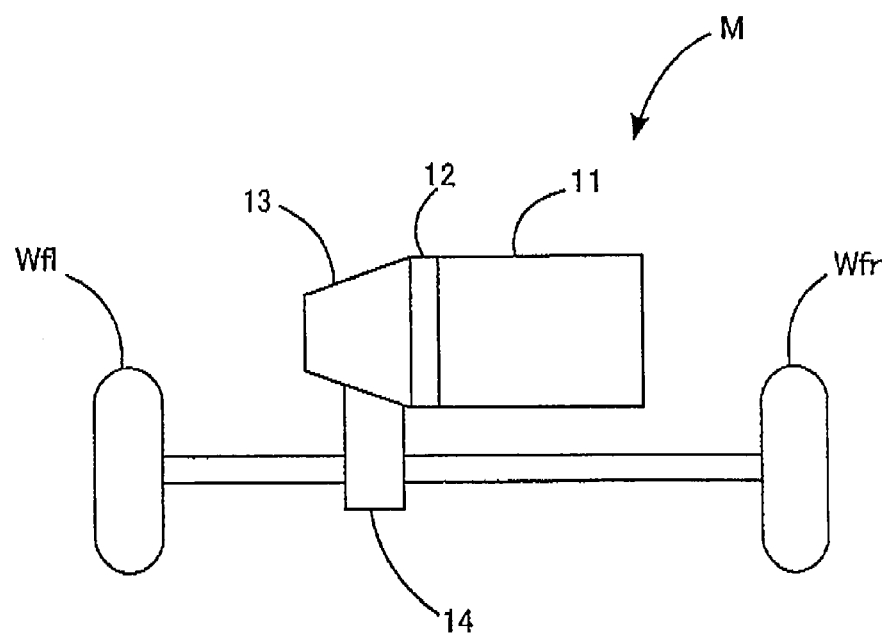
FIG. 1 is a schematic view illustrating a configuration of a vehicle to which an automated transmission including a dog clutch according to an embodiment disclosed here is applied.

As illustrated in FIG. 1, a vehicle M includes an engine 11, a clutch 12, an automated transmission (e.g. automated manual transmission) 13, a differential gear device 14, and driving wheels, specifically, front-left and front-right driving wheels Wfl and Wfr. The engine 11 generates a driving force by combustion of fuel. The driving force of the engine 11 is configured to be transmitted to the driving wheels Wfl and Wlr via the clutch 12, the automated transmission 13, and the differential gear device 14. That is, the vehicle M is a front-wheel-drive vehicle.

The clutch 12 is configured to be automatically connected or disconnected on a basis of a command from a control device. The automated transmission 13 includes a dog clutch mechanism for automatically selecting between five forward speeds and one reverse speed, for example. The differential gear device 14 that includes both a final gear and a differential gear is integrally formed with the automated transmission 13.

Figure 2:
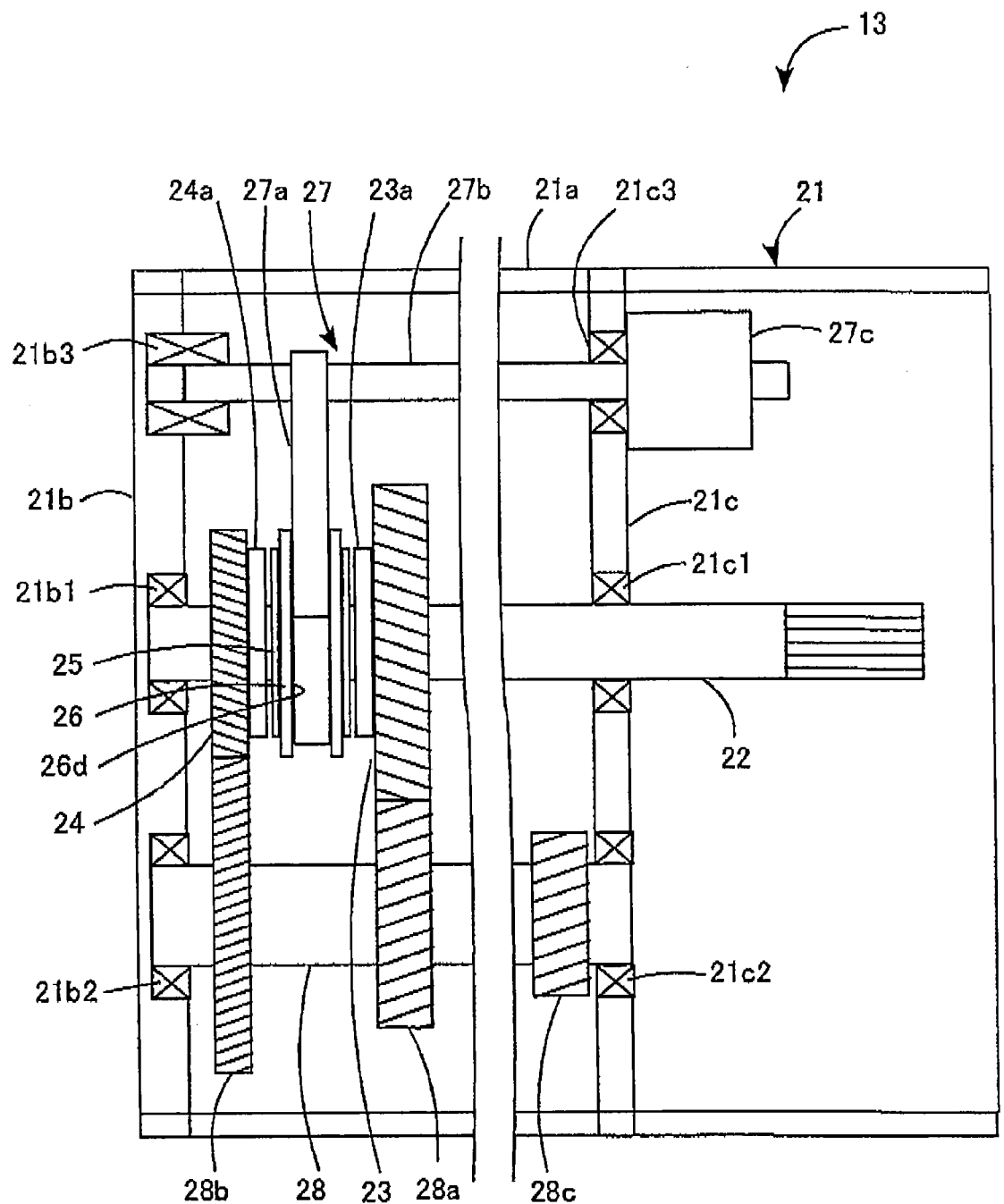
FIG. 2 is a schematic view illustrating a configuration of the automated transmission.

As illustrated in FIG. 2, the automated transmission 13 includes a casing 21, an input shaft 22, a first input gear 23 serving as a first clutch ring and a clutch ring, a second input gear 24 serving as a second clutch ring and the clutch ring, a clutch hub 25 serving as a hub, a sleeve 26, an axial driving mechanism 27 serving as an axial driving device, and an output shaft 28.

The casing 21 includes a body portion 21a formed into a substantially cylindrical form including a bottom, a first wall 21b serving as a bottom wall of the body portion 21a, and a second wall 21c dividing an inside of the body portion 21a in a horizontal direction in FIG. 2.

The input shaft 22 is rotatably supported by the casing 21. Specifically, a first end (a left end in FIG. 2) of the input shaft 22 is rotatably supported by the first wall 21b via a bearing 21b1 while a second end (a right end in FIG. 2) of the input shaft 22 is rotatably supported by the second wall 21c via a bearing 21c1. The second end of the input shaft 22 is rotatably connected to an output shaft of the engine 11 via the clutch 12. Accordingly, an output of the engine 11 is input to the input shaft 22 in a state where the clutch 12 is in a connected state. The input shaft 22 serves as a rotary shaft according to the embodiment.

The first input gear 23 and the second input gear 24 are rotatably supported by the input shaft 22. In addition, the clutch hub 25 is fixed to the input shaft 22 by spline-fitting, for example, in a state to be arranged adjacent to the first input gear 23 and the second input gear 24 therebetween.

Figure 3:
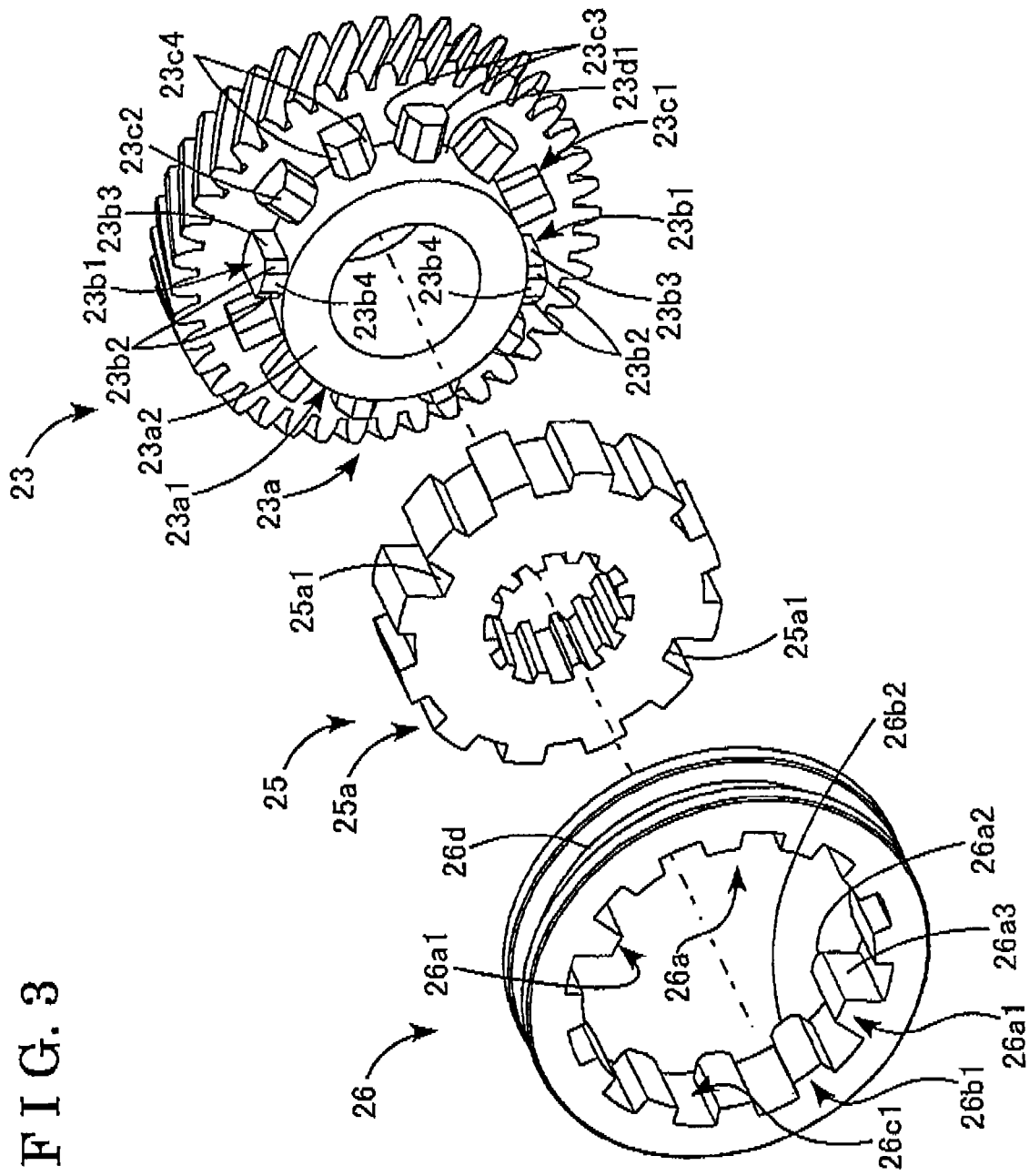
FIG. 3 is a perspective view illustrating a first input gear, a clutch hub, and a sleeve constituting the dog clutch.

As illustrated in FIG. 3, a first dog clutch portion 23a is formed at a side surface of the first input gear 23 so as to face the clutch hub 25, The first dog clutch portion 23a engages with a spline 26a formed at the sleeve 26. In addition, a second dog clutch portion 24a is formed at a side surface of the second input gear 24 so as to face the clutch hub 25. The second dog clutch portion 24a engages with the spline 26a of the sleeve 26. The first dog clutch portion 23a of the first input gear 23 and the second dog clutch portion 24a of the second input gear 24 have substantially the same configurations. Thus, details of the first input gear 23, the clutch hub 25 and the sleeve 26 will be explained below with reference to FIG. 3.

Figure 4B:
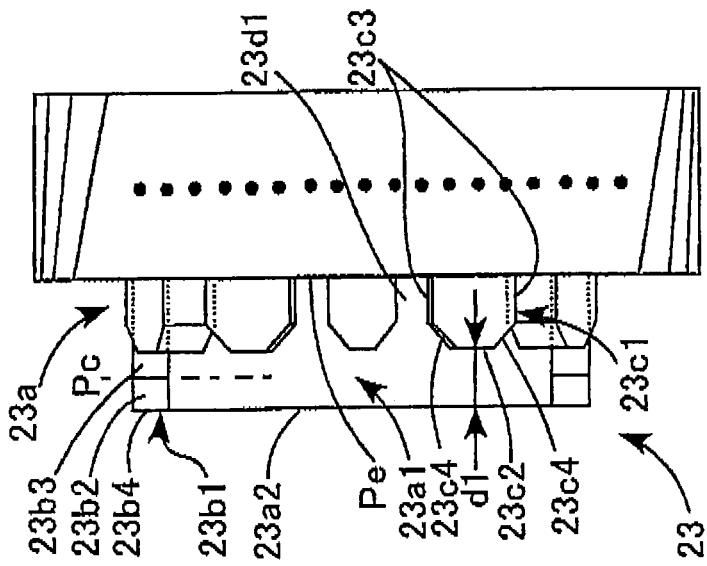
FIG. 4B is a side view of the first input gear.
Figure 4A:
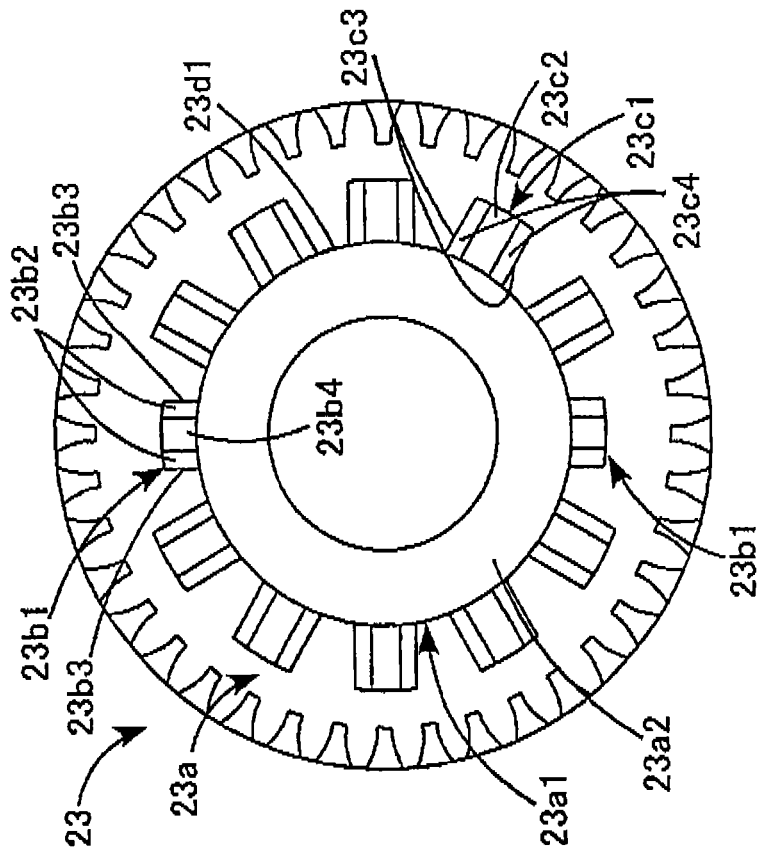
FIG. 4A is a plan view illustrating the first input gear illustrated in FIG. 3.

As illustrated in FIGS. 3, 4A and 4B, according to the present embodiment, the first dog clutch portion 23a includes a convex portion 23a1 formed in a ring form, two clutch forward teeth 23b1, and ten clutch rearward teeth 23c1. The two clutch forward teeth 23b1 are arranged at an outer periphery of the convex portion 23a1 at a 180 degree interval. Five of the ten clutch rearward teeth 23c1 are arranged at a first half of the outer periphery of the convex portion 23a1 at equal intervals between the two clutch forward teeth 23b1 while another five of the ten clutch rearward teeth 23c1 are arranged at a second half of the outer periphery of the convex portion 23a1 at equal intervals between the two clutch forward teeth 23b1. Each clutch tooth groove 23d1 is formed between the clutch forward tooth 23b1 and the clutch rearward tooth 23c1, and between the clutch rearward teeth 23c1 adjacent to each other at the outer periphery of the convex portion 23a1 while having a predetermined width in a circumferential direction of the convex portion 23a1.

The convex portion 23a1 is formed so that an outer diameter thereof is smaller than an inner diameter of high teeth 26a1 of the spline 26a formed at the sleeve 26. The clutch forward teeth 23b1 are formed so that an outer diameter thereof is greater than the inner diameter of the high teeth 26a1 of the spline 26a and is smaller than an inner diameter of short teeth 26b1. The clutch rearward teeth 23c1 are formed to be engageable with spline tooth grooves 26c1 of the spline 26a. That is, the clutch forward teeth 23b1 are inhibited from engaging with the short teeth 26b1 and are engageable with the high teeth 26a1. The clutch rearward teeth 23c1 are formed to be engageable with both the high teeth 26a1 and the short teeth 26b1. The high teeth 26a1 serve as first teeth while the short teeth 26b1 serve as second teeth.

The number of clutch forward teeth 23b1 is the same as the number of high teeth 26a1. Specifically, according to the embodiment, two of the clutch forward teeth 23b1 and two of the high teeth 26a1 are formed. A small number of clutch forward teeth 23b1 is provided so that each of the high teeth 26a1 may easily enter between two of the clutch forward teeth 23b1 even in a case where a rotation speed of the sleeve 26 and a rotation speed of the first input gear 23 are greatly different from each other. Each clutch forward tooth 23b1 is formed to extend, at a position facing each high tooth 26a1, from a front end surface 23a2 of the convex portion 23a1 to a rear end position Pe of the first dog clutch portion 23a. Each clutch rearward tooth 23c1 is formed to extend from a position retracted or rearward by a first predetermined distance d1 from the front end surface 23a2 of the convex portion 23a1 to the rear end position Pe of the first dog clutch portion 23a.

A contact surface 23b4 is formed at a front end portion of the clutch forward tooth 23b1 facing the high tooth 26a1 so as to be contactable with the high tooth 26a1. In addition, inclined surfaces 23b2 are formed at the front end portion of the clutch forward tooth 23b1 so as to incline from both ends of the contact surface 23b4 in the circumferential direction to the rear end position Pe of the first dog clutch portion 23a. The contact surface 23b4 of the clutch forward tooth 23b1 is formed to be coplanar with the front end surface 23a2 of the convex portion 23a1 or formed in a planer shape in parallel with the front end surface 23a2. Further, a contact surface 23c2 is formed at the clutch rearward tooth 23c1 so as to be contactable with each of the high teeth 26a1 and each of the short teeth 26b1. As illustrated in FIG. 4B, each of the inclined surfaces 23b2 of the clutch forward tooth 23b1 is formed so that a position Pc at which the inclined surface 23b2 intersects with a side surface 23b3 of the clutch forward tooth 23b1 is arranged closer to the front end surface 23a2 of the convex portion 23a1 relative to the contact surface 23c2 of the clutch rearward tooth 23c1. The intersect portion between the contact surface 23b4 and each of the inclined surfaces 23b2 of the front end portion of the clutch forward tooth 23b1 is generally round chamfered, i.e., formed in a round form.

Figure 7A:
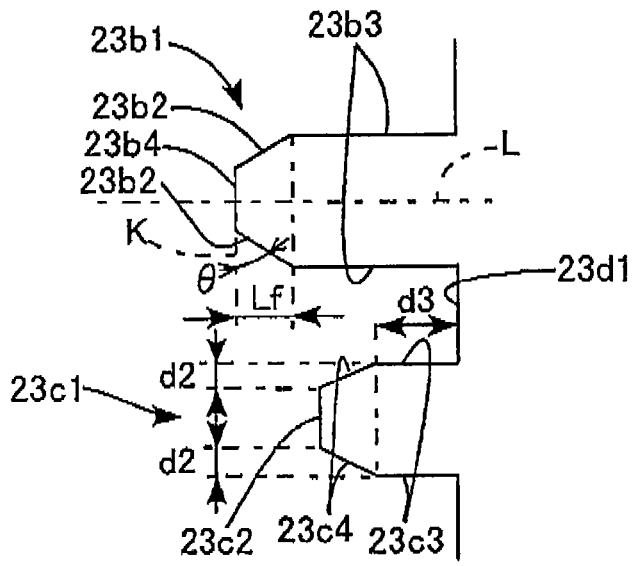
FIG. 7A is a first diagram illustrating a positional relationship between portions of a clutch forward tooth and portions of a clutch rearward tooth of the first input gear.

At this time, each of the inclined surfaces 23b2 of the clutch forward tooth 23b1 may be formed in two different ways, which will be appropriately chosen depending on performance of the automated transmission. In the first way, as illustrated in FIG. 7A, the inclined surface 23b2 is formed in such a way that a length Lf of the inclined surface 23b2 in a direction of an axial line L is defined as short as possible so that a linear portion of each of the side surfaces 23b3 is secured. As a result, the inclined surface 23b2 is formed in a gentle slope, i.e., an inclined angle θ formed between the inclined surface 23b2 and a line K perpendicular to the axial line L is small. Thus, a front end surface 26a2 (a chamfered portion) of the high tooth 26a1 is gently contactable with each of the inclined surfaces 23b2 of the clutch forward tooth 23b1. Increase and decrease of a rotation speed of the sleeve 26 may be easily adjustable accordingly. In addition, each side surface 26a3 of the high tooth 26a1 makes contact with each of the side surfaces 23b3 of the clutch forward tooth 23b1 in a wide range, which leads to a rapid increase and decrease of the rotation speed of the sleeve 26.

Figure 7B:
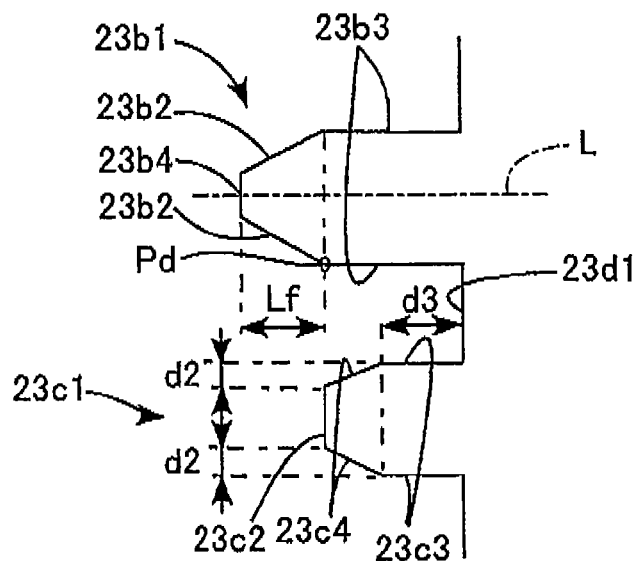
FIG. 7B is a second diagram illustrating a positional relationship between portions of the clutch forward tooth and portions of the clutch rearward tooth of the first input gear.

In the second way, as illustrated in FIG. 7B, the inclined surface 23b2 is formed in such a way that a position Pd at which the inclined surface 23b2 intersects with the side surface 23b3 of the clutch forward tooth 23b1 is arranged at the same position as the contact surface 23c2 of the clutch rearward tooth 23c1 in the direction of the axial line L. Thus, the inclined surface 23b2 of the clutch forward tooth 23b1 is elongated so that the front end surface 26a2 of the high tooth 26a1 is contactable for a long time period in a long distance with the inclined surface 23b2 of the clutch forward tooth 23b1. The rotation speed of the sleeve 26 may easily increase and decrease accordingly.

The contact surface 23c2 is formed at the clutch rearward tooth 23c1 so as to extend between positions inward from the respective side surfaces 23c3 by a second predetermined distance d2 in the circumferential direction. In addition, side inclined surfaces 23c4 are formed at the side surfaces 23c3 of the clutch rearward tooth 23c1 so as to extend from both end portions of the contact surface 23c2 in the circumferential direction to a position in front of, i.e., forward from, the rear end position Pe of the first dog clutch portion 23a by a third predetermined distance d3 in the direction of the axial line L.

Figure 8:
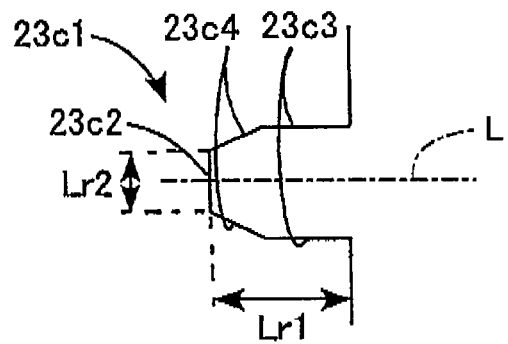
FIG. 8 is a diagram illustrating a positional relationship between portions of the clutch rearward tooth of the first input gear.

Each of the side inclined surfaces 23c4 of the clutch rearward tooth 23c1 is formed in the following way. As illustrated in FIG. 8, a length Lr1 of the clutch rearward tooth 23c1 is determined so that a linear portion of the side surface 23c3 is secured or maintained for a sufficient torque transmission after the high teeth 26a1 and the short teeth 26b1 engage with the clutch rearward teeth 23c1. In addition, a length Lr2 of the contact surface 23c2 is determined for generating a sufficient friction force when the front end surface 26a2 of the high tooth 26a1 and a front end surface 26b2 of the short tooth 26b1 make contact with the corresponding contact surfaces 23c2 of the clutch rearward teeth 23c1. The length Lr2 may be defined to be a half of a face width of the clutch rearward tooth 23c1, i.e., a half of a length of the clutch rearward tooth 23c1 in a direction perpendicular to the direction of the axial line L, for example. The side inclined surface 23c4 is formed on a basis of the lengths Lr1 and Lr2 determined in the aforementioned manner.

A gear, specifically, a helical gear, is formed at an outer peripheral surface of the first input gear 23 to engage with a first output gear 28a. In addition, a gear, specifically, a helical gear, is formed at an outer peripheral surface of the second input gear 24 to engage with a second output gear 28b.

Figure 5:
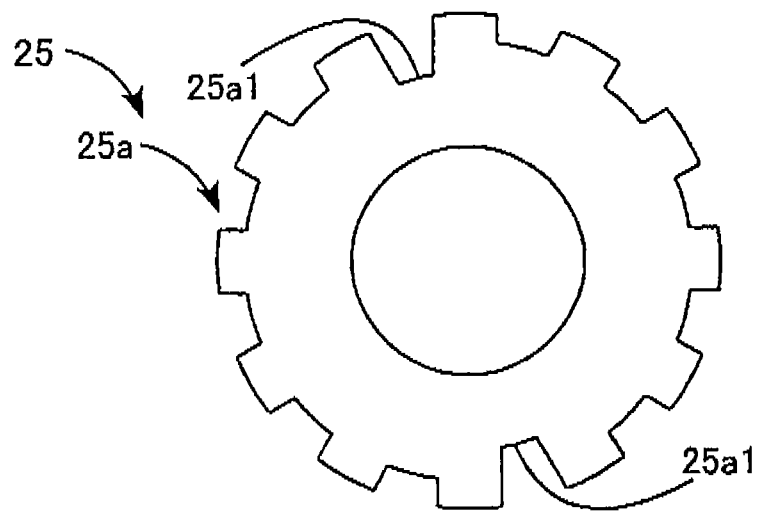
FIG. 5 is a plan view of the clutch hub constituting the dog clutch.

As illustrated in FIGS. 3 and 5, a spline 25a is formed at an outer peripheral surface of the clutch hub 25. The spline 25a engages with the spline 26a formed at an inner peripheral surface of the sleeve 26 in a state to be slidable in the axial direction of the input shaft 22. The spline 25a includes grooves some of which, for example, two grooves 25a1 according to the embodiment, are more deeply formed than the other grooves. The groove 25a1 is configured to conform to a tooth profile of each of the high teeth 26a1.

Figure 6:
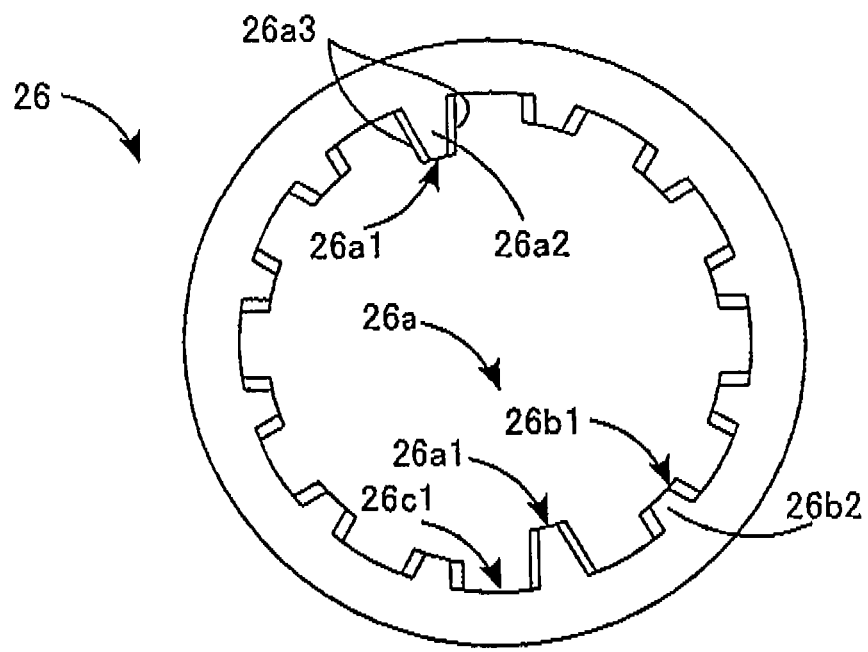
FIG. 6 is a plan view of the sleeve constituting the dog clutch.

As illustrated in FIGS. 3 and 6, the sleeve 26 formed in a ring form is integrally rotatable and axially slidable relative to the clutch hub 25. The spline 26a is formed at the inner peripheral surface of the sleeve 26 to engage with the spline 25a formed at the outer peripheral surface of the clutch hub 25 in such a way to be slidable relative to the spline 25a in the axial direction. The spline 26a includes the plural high teeth 26a1, for example, two high teeth 26a1 according to the embodiment. A whole depth, i.e., a radial length, of each high tooth 26a1 is greater than a whole depth, i.e., a radial length, of each short tooth 26b1. Corners of side ends of the front end surfaces 26a2 and 26b2 of the high tooth 26a1 and the short tooth 26b1 in the circumferential direction facing the first input gear 23 are chamfered at 45 degrees i.e., formed in C-shapes, so that the high tooth 26a1 and the short tooth 26b1 are inhibited from being damaged by an impact that occurs when the high tooth 26a1 and the short tooth 26b1 make contact with the clutch forward tooth 23b1 and the clutch rearward tooth 230. An outer peripheral groove 26d is formed at an outer peripheral surface of the sleeve 26 in a circumferential direction. An arc end portion (end portion) of a fork 27a engages with the outer peripheral groove 26d so as to be slidable in the circumferential direction.

As illustrated in FIG. 2, the axial driving mechanism 27 drives the sleeve 26 to reciprocate in the axial direction. The axial driving mechanism 27 allows the sleeve 26 to move by a reaction force that is applied from the first input gear 23 or the second input gear 24 in a case where the sleeve 26 is pressed against the first input gear 23 or the second input gear 24.

The axial driving mechanism 27 includes the fork 27a, a fork shaft 27b, and a drive device 27c serving as an actuator. The end portion of the fork 27a is formed to conform to an outer peripheral shape of the outer peripheral groove 26b of the sleeve 26. A base portion of the fork 27a is fixed to the fork shaft 27b. The fork shaft 27b is supported by the casing 21 so as to be slidable in the axial direction. Specifically, a first end (i.e., a left end in FIG. 2) of the fork shaft 27b is supported by the first wall 21b via a bearing 21b3 while a second end (i.e., a right end in FIG. 2) of the fork shaft 27b is supported by the second wall 21c via a bearing 21c3. The second end of the fork shaft 27b is arranged to penetrate through the axial driving mechanism 27.

The drive device 27c is a linear drive device driven by a linear motor, i.e., a linear motor serves as a driving source. A known linear motor may be applied to the drive device 27c. Specifically, the drive device 27c is constituted by plural coils arranged side by side in the axial direction to form a cylindrical core. Plural north-pole magnets and plural south-pole magnets are alternately arranged side by side at the fork shaft 27b that extends through a through-hole of the cylindrical core obtained by the plural coils. An electric power supplied to each of the coils is controlled so that the fork shaft 27b may reciprocate in the axial direction or may be positioned and fixed at a predetermined position.

According to the embodiment, the linear drive device is used as the drive device 27c. Alternatively, as long as the drive device 27c is configured so that the sleeve 26 is allowed to move by the reaction force that is applied from the first input gear 23 or the second input gear 24 in a case where the sleeve 26 is pressed against the first input gear 23 or the second input gear 24, other drive devices, for example, a solenoid drive device and a hydraulic drive device, may be used.

The output shaft 28 serving as a countershaft is rotatably supported by the casing 21. A first end (i.e., a left end in FIG. 2) of the output shaft 28 is rotatably supported by the first wall 21b via a bearing 21b2 while a second end (i.e., a right end in FIG. 2) of the output shaft 28 is rotatably supported by the second wall 21c via a bearing 21c2.

The first output gear 28a, the second output gear 28b, and a third output gear 28c are fixed to the output shaft 28 by spline-fitting, for example.

A gear, specifically, a helical gear, is formed at an outer peripheral surface of the first output gear 28a to engage with the first input gear 23. In addition, a gear, specifically, a helical gear, is formed at an outer peripheral surface of the second output gear 28b to engage with the second input gear 24. Further, a gear, specifically, a helical gear, is formed at an outer peripheral surface of the third output gear 28c to engage with an input gear of the differential gear device 14. Accordingly, the driving force of the engine 11 is input from the input shaft 22 to be transmitted to the output shaft 28 and is finally output to the differential gear device 14 via the third output gear 28c.

Next, operations of the high teeth 26a1 and the short teeth 26b1 of the sleeve 26, and the clutch forward teeth 23b1 and the clutch rearward teeth 23c1 of the first input gear 23 according to the embodiment of the dog clutch for the automated transmission will be explained with reference to FIGS. 9 to 12. In a case where the sleeve 26 engages with the second input gear 24 to rotate at a high speed and the first input gear 23 rotates at a low speed, for example, the sleeve 26 is shifted to engage with the first input gear 23 to thereby decrease the rotation speed of the sleeve 26. On the other hand, in a case where the sleeve 26 engages with the first input gear 23 to rotate at a low speed and the second input gear 24 rotates at a high speed, the sleeve 26 is shifted to engage with the second input gear 24 to thereby increase the rotation speed of the sleeve 26. In the following, a case where the rotation speed of the sleeve 26 decreases will be explained.

Figure 9A:
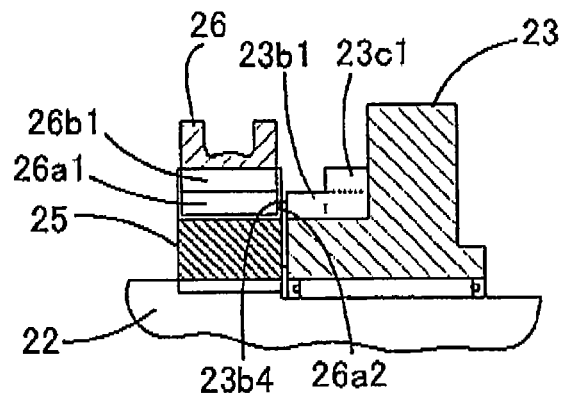
FIG. 9A is a diagram explaining an entire operation of the dog clutch and illustrating a state before a shifting operation is performed.
Figure 9B:
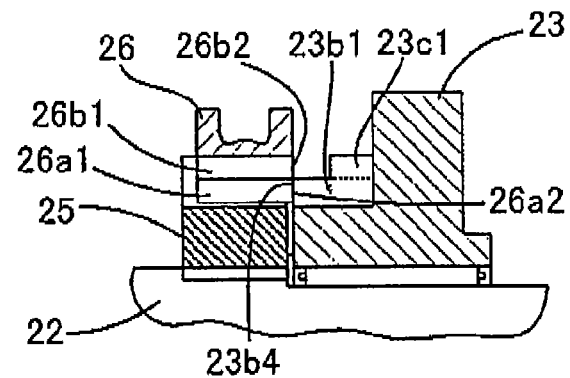
FIG. 9B is a diagram explaining the entire operation of the dog clutch and illustrating a state in which a high tooth makes contact with the clutch forward tooth.

As illustrated in FIG. 9A, the sleeve 26 is positioned away from the first input gear 23 before a shifting operation of the automated transmission 13. When the sleeve 26 moves in the axial direction towards the first input gear 23 by the axial driving mechanism 27, the front end surface 26a2 of the high tooth 26a1 makes contact with the contact surface 23b4 of the clutch forward tooth 23b1 as illustrated in FIGS. 9B and 10A. At this time, the short teeth 26b1 are inhibited from making contact with any of the clutch forward teeth 23b1 or the clutch rearward teeth 23c1. As a result, the rotation speed of the sleeve 26 is slightly reduced.

In a case where the sleeve 26 moves further in the axial direction by the axial driving mechanism 27, the front end surface 26a2 (the chamfered portion) of the high tooth 26a1 makes contact with the inclined surface 23b2 of the clutch forward tooth 23b1 as illustrated in FIG. 10B. At this time, the short teeth 26b1 are inhibited from making contact with any of the clutch forward teeth 23b1 or the clutch rearward teeth 23c1. Accordingly, the rotation speed of the sleeve 26 greatly decreases.

Figure 9C:
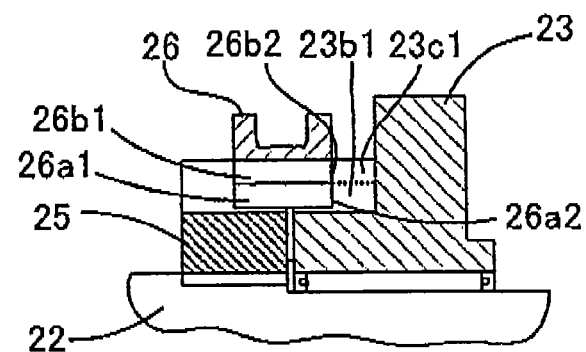
FIG. 9C is a diagram explaining the entire operation of the dog clutch and illustrating a state in which the high tooth and a short tooth make contact with the respective clutch rearward teeth.

In a case where the sleeve 26 moves further in the axial direction by the axial driving mechanism 27, the front end surface 26a2 of the high tooth 26a1 and the front end surface 26b2 of the short tooth 26b1 make contact with the respective corresponding contact surfaces 23c2 of the clutch rearward teeth 23c1 as illustrated in FIGS. 9C and 10C. Accordingly, the rotation speed of the sleeve 26 slightly decreases.

Figure 9D:
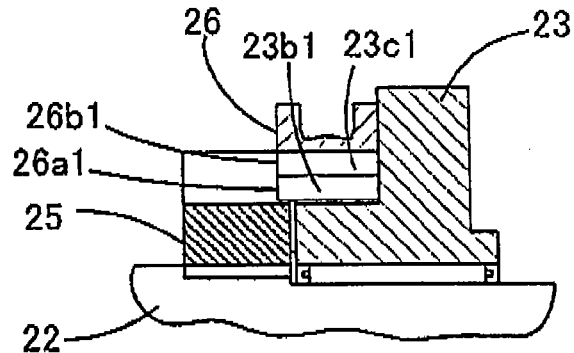
FIG. 9D is a diagram explaining the entire operation of the dog clutch and illustrating a state in which the high tooth and the short tooth engage with the respective clutch rearward teeth.
Figure 10D:
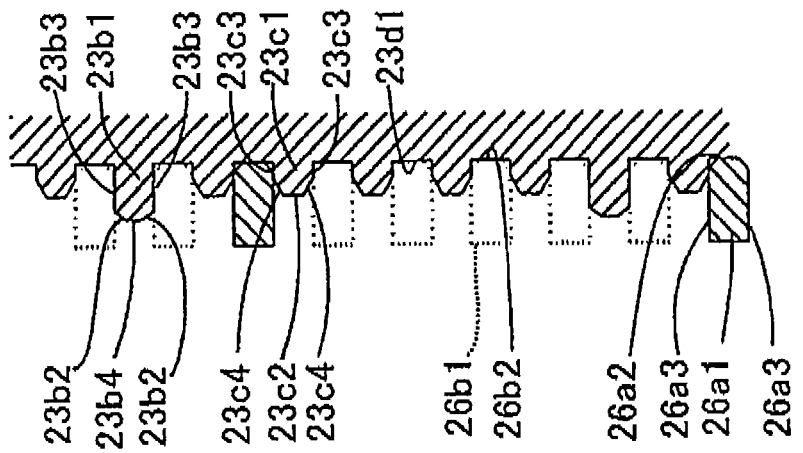
FIG. 10D is a diagram explaining the partial operation of the dog clutch and illustrating a state in which the high tooth and the short tooth make contact with side inclined surfaces of the respective clutch rearward teeth.
Figure 10E:
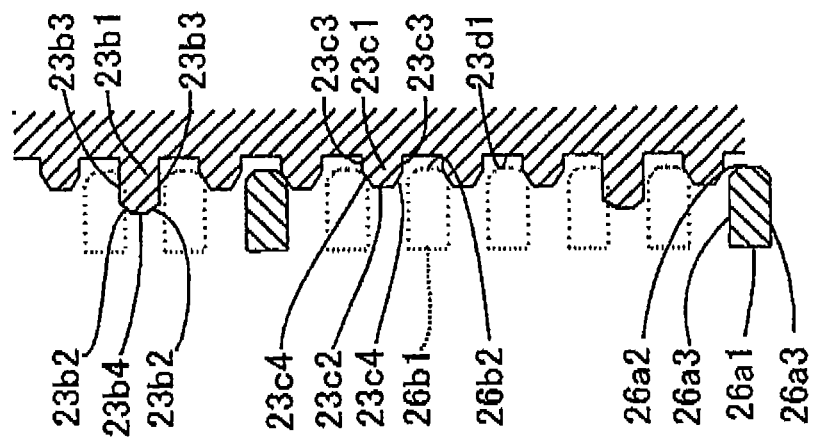
FIG. 10E is a diagram explaining the partial operation of the dog clutch and illustrating a state in which the high tooth and the short tooth engage with the respective clutch rearward teeth.

In a case where the sleeve 26 moves further in the axial direction by the axial driving mechanism 27, two different operation states of the high teeth 26a1, the short teeth 26b1, the clutch forward teeth 23b1, and the clutch rearward teeth 23c1 are selectively obtained. According to a first operation state, as illustrated in FIG. 10D, the front end surface 26a2 of the high tooth 26a1 and the front end surface 26b2 of the short tooth 26b1 make contact with the respective corresponding side inclined surfaces 23c4 of the clutch rearward teeth 23c1. Because the clutch tooth grooves 23d1 each of which has a predetermined width in the circumferential direction are formed between the clutch forward tooth 23b1 and the clutch rearward tooth 23c1 and between the clutch rearward teeth 23c1 adjacent to each other at the outer periphery of the convex portion 23a1, the high teeth 26a1 and the short teeth 26b1 may enter the nearest or adjacent clutch tooth grooves 23d1 for a short time period. Accordingly, the rotation speed of the sleeve 26 greatly decreases. In a case where the sleeve 26 moves further in the axial direction by the axial driving mechanism 27, as illustrated in FIGS. 9D and 10E, the high teeth 26a1 and the short teeth 26b1 fully engage with the respective clutch rearward teeth 23c1. As a result, the sleeve 26 and the first input gear 23 rotate in synchronization with each other to thereby complete the shifting operation.

Figure 11A:
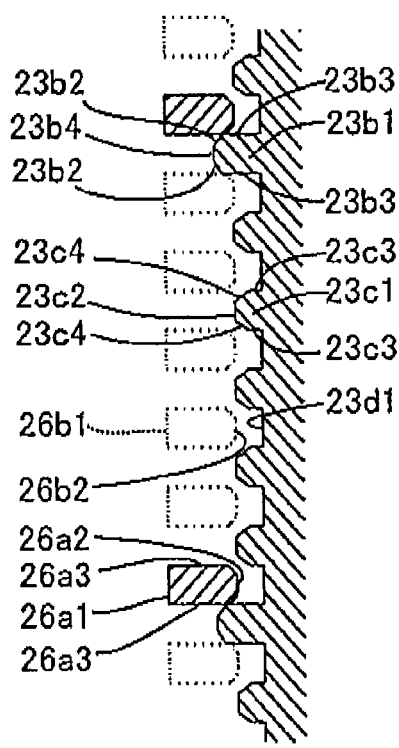
FIG. 11A is a diagram explaining the partial operation of the dog clutch and illustrating a state in which the high tooth makes contact with a side surface of the clutch forward tooth.
Figure 11B:
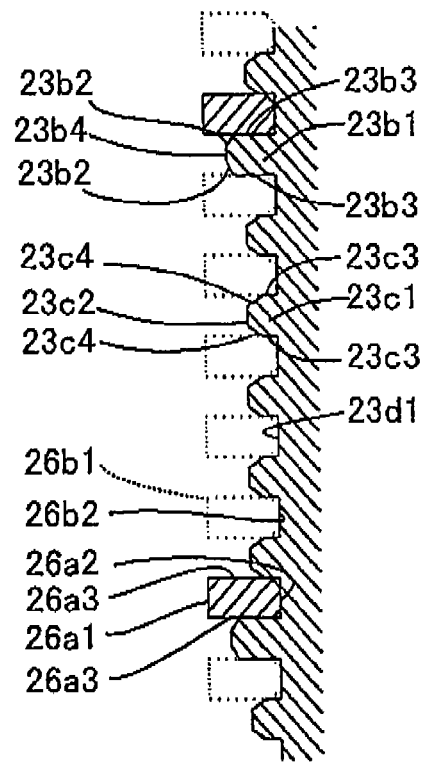
FIG. 11B is a diagram explaining the partial operation of the dog clutch and illustrating a state in which the high tooth and the short tooth engage with the respective clutch rearward teeth.

According to a second operation state in which the high teeth 26a1 and the short teeth 26b1 are inhibited from being inserted to the nearest or adjacent clutch tooth grooves 23d1, the side surface 26a3 of the high tooth 26a1 makes contact with the side surface 23b3 of the clutch forward tooth 23b1 as illustrated in FIG. 11A. At this time, the short teeth 26b1 are inhibited from making contact with any of the clutch forward teeth 23b1 or the clutch rearward teeth 23c1. Accordingly, the rotation speed of the sleeve 26 greatly decreases. In a case where the sleeve 26 moves further in the axial direction by the axial driving mechanism 27, as illustrated in FIGS. 9D and 11B, the high teeth 26a1 and the short teeth 26b1 fully engage with the respective clutch rearward teeth 23c1. As a result, the sleeve 26 and the first input gear 23 rotate in synchronization with each other to thereby complete the shifting operation.

Figure 12A:
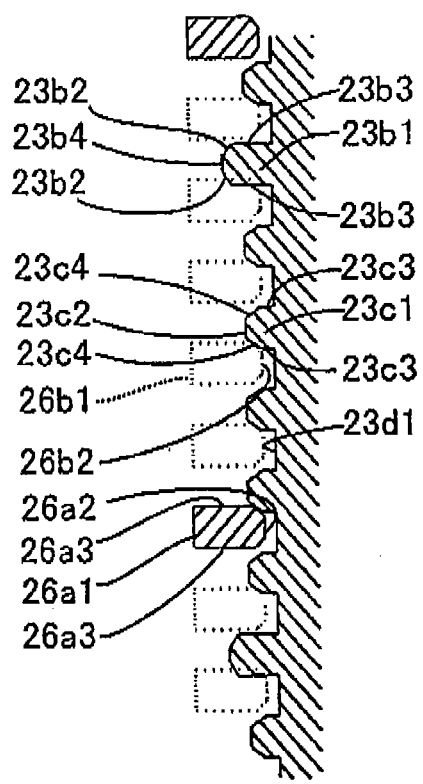
FIG. 12A is a diagram explaining the partial operation of the dog clutch and illustrating a state in which the high tooth makes contact with the side inclined surface of the clutch rearward tooth.
Figure 12B:
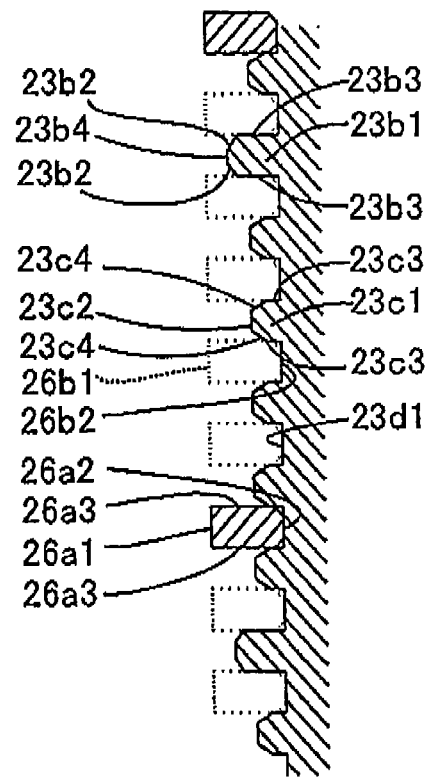
FIG. 12B is a diagram explaining the partial operation of the dog clutch and illustrating a state in which the high tooth and the short tooth engage with the respective clutch rearward teeth.

In a case where the rotation speed of the sleeve 26 excessively decreases when the side surface 26a3 of the high tooth 26a1 makes contact with the side surface 23b3 of the clutch forward tooth 23b1 as illustrated in FIG. 11A, the front end surface 26a2 (the chamfered portion) of the high tooth 261a and the front end surface 26b2 (the chamfered portion) of the short tooth 26b1 make contact with the respective side inclined surfaces 23c4 of the clutch rearward teeth 23c1 as illustrated in FIG. 12A. Then, in a case where the sleeve 26 moves further in the axial direction by the axial driving mechanism 27, the high teeth 26a1 and the short teeth 26b1 fully engage with the respective clutch rearward teeth 23c1. As a result, the sleeve 26 and the first input gear 23 rotate in synchronization with each other to thereby complete the shifting operation.

According to the dog clutch for the automated transmission as mentioned above, the high teeth 26a1 first make contact with the clutch forward teeth 23b1 to thereby decrease (or increase) the rotation speed of the sleeve 26. Next, the high teeth 26a1 and the short teeth 26b1 make contact with the clutch rearward teeth 23c1 to thereby decrease (or increase) the rotation speed of the sleeve 26. Thus, the rotation of the sleeve 26 and the rotation of the first input gear 23 are synchronized with each other for a short time period. In addition, each of the high teeth 26a1 and each of the short teeth 26b1 are both engageable with the clutch tooth groove 23d1 formed between the clutch forward tooth 23b1 and the clutch rearward tooth 23c1, and the clutch tooth groove 23d1 formed between the clutch rearward teeth 23c1 adjacent to each other. Therefore, after the high teeth 26a1 and the short teeth 26b1 make contact with the respective corresponding clutch rearward teeth 23c1, the high teeth 26a1 and the short teeth 26b1 may enter the nearest clutch tooth grooves 23d1 for a short time period. Time for the shifting operation may be reduced accordingly.

Because the contact surface 23b4 is formed at the front end portion of the clutch forward tooth 23b1, a fine adjustment of rotation differences between the sleeve 26 and the first input gear 23, i.e., an adjustment for obtaining the rotation differences by which each of the high teeth 26a1 is likely to be inserted and disposed between the clutch forward teeth 23b1, may be easily performed by means of a friction between the high teeth 26a1 and the contact surfaces 23b4 of the clutch forward teeth 23b1 when the high teeth 26a1 make contact with the respective front end portions of the clutch forward teeth 23b1. In addition, because of the inclined surfaces 23b2 formed at the front end portion of the clutch forward tooth 23b1, the clutch forward tooth 23b1 makes contact with the high tooth 26a1 for a long time period in a long distance as compared to a case where the inclined surfaces 23b2 are not formed. As s result, the rotation speed of the sleeve 26 may easily increase or decrease. Further, the high teeth 26a1 and the short teeth 26b1 make contact with the clutch rearward teeth 23c1 via the respective contact surfaces 23c2, thereby generating a sufficient friction force.

The position Pc at which the inclined surface 23b2 intersects with the side surface 23b3 of each of the clutch forward teeth 23b1 is arranged closer to the front end surface 23a2 of the convex portion 23a1 relative to the contact surface 23c2 of each of the clutch rearward teeth 23c1. Thus, the high teeth 26a1 and the short teeth 26b1 may securely make contact with the respective contact surfaces 23c2 of the clutch rearward teeth 23c1 after making contact with the inclined surfaces 23b2 of the clutch forward teeth 23b1. In addition, in a case where the high teeth 26a1 and the short teeth 26b make contact with the respective clutch rearward teeth 23c1, the high teeth 26a1 and the short teeth 26b may immediately make contact with the side inclined surfaces 23c4 after making contact with the contact surfaces 23c2. Further, because the linear portions are secured and maintained at the respective side surfaces 23c3 of the clutch rearward teeth 23c1, a sufficient torque transmission is obtainable after the high teeth 26a1 and the short teeth 26b1 engage with the clutch rearward teeth 23c1.

According to the aforementioned embodiment, the corners of side ends of the front end surfaces 26a2 and 26b2 of the high teeth 26a1 and the short teeth 26b1 in the circumferential direction facing the first input gear 23 are chamfered at 45 degrees i.e., formed in C-shapes. Alternatively, the aforementioned corners may not be chamfered. In addition, according to the embodiment, the inclined surfaces 23b2 are formed at the clutch forward teeth 23b1 while the side inclined surfaces 23c4 are formed at the clutch rearward teeth 23c1. Alternatively, one of or both of the inclined surfaces 23b2 and the side inclined surfaces 23c4 may not be formed.

According to the aforementioned embodiment, the input shaft 22 serves as the rotary shaft. Alternatively, the output shaft 28 may serve as the rotary shaft. In this case, the first input gear 23 and the second input gear 24 are fixed to the input shaft 22 by spiline-fitting, for example, The first output gear 28a serving as the clutch ring at which the dog clutch portion is formed, the second output gear 28b serving as the clutch ring at which the dog clutch portion is formed, and the third output gear 28c are rotatably supported by the output shaft 28. Further, the clutch hub 25 is fixed to the output shaft 28 by spline-fitting, for example, while being arranged adjacent to the first output gear 28a and the second output gear 28b therebetween.

According to the aforementioned embodiment, each of the clutch forward teeth 23b1 includes the contact surface 23b4 at the front end portion facing the high teeth 26a1, the contact surface 23b4 being engageable with each of the high teeth 26a1, and inclined surfaces 23b2 formed at both ends of the contact surface 23b4 in the circumferential direction to incline towards the rear end position Pe.

In addition, according to the aforementioned embodiment, each of the clutch rearward teeth 23c1 includes the contact surface 23c2 engageable with each of the high teeth 26a1 and each of the short teeth 26b1 of the spline 26, and the position Pc at which each of the inclined surfaces 23b2 intersects with each of side surfaces 23b3 of each of the clutch forward teeth 23b1 is closer to the front end surface 23a2 relative to the contact surface 23c2.

Further, according to the aforementioned embodiment, the contact surface 23c2 is formed at each of the clutch rearward teeth 23c1 to extend between positions inward from the side surfaces 23c3 by the second predetermined distance d2 in the circumferential direction, and the side inclined surfaces 23c4 are formed at the side surfaces 23c3 of each of the clutch rearward teeth 23c1 to extend from both end portions of the contact surface 23c2 in the circumferential direction to a position forward from the rear end position Pe by the third predetermined distance d3 in the direction of the axial line L.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A dog clutch for an automated transmission, comprising:
a rotary shaft rotatably connecting to one of an input shaft and an output shaft of the automated transmission and provided rotatably about an axial line;
a clutch ring rotatably supported by the rotary shaft and rotatably connecting to the other of the input shaft and the output shaft;
a hub fixed to the rotary shaft and arranged adjacent to the clutch ring;
a sleeve slidably engaging with the hub in a direction of the axial line, the sleeve including a spline, the spline including a plurality of first teeth and a plurality of second teeth, a whole depth of each of the first teeth being greater than a whole depth of each of the second teeth;
an axial driving device moving the sleeve in the direction of the axial line; and
a dog clutch portion provided at the clutch ring to project towards the sleeve, the dog clutch portion selectively engaging and disengaging relative to the spline formed at the sleeve when the sleeve moves in the direction of the axial line, wherein
the dog clutch portion including clutch forward teeth of which an outer diameter is greater than an inner diameter of the first teeth and smaller than an inner diameter of the second teeth, a teeth number of the clutch forward teeth being equal to a teeth number of the first teeth, each of the clutch forward teeth being formed at a position facing each of the first teeth to extend from a front end surface of the dog clutch portion to a rear end position of the dog clutch portion, the dog clutch portion including clutch rearward teeth engageable with tooth grooves formed at the spline and formed to extend from a position retracted by a first predetermined distance from the front end surface of the dog clutch portion to the rear end position of the dog clutch portion, and
each of the first teeth and each of the second teeth are both engageable with a clutch tooth groove formed between one of the clutch forward teeth and one of the clutch rearward teeth, and with a clutch tooth groove formed between the clutch rearward teeth adjacent to each other.

2. The dog clutch according to claim 1, wherein each of the clutch forward teeth includes a first contact surface at a front end portion facing the first teeth, the first contact surface being engageable with each of the first teeth, and inclined surfaces formed at both ends of the first contact surface in a circumferential direction to incline towards the rear end position.

3. The dog clutch according to claim 2, wherein each of the clutch rearward teeth includes a second contact surface engageable with each of the first teeth and each of the second teeth of the spline, and a position at which each of the inclined surfaces intersects with each of side surfaces of each of the clutch forward teeth is closer to the front end surface relative to the second contact surface.

4. The dog clutch according to claim 3, wherein the second contact surface is formed at each of the clutch rearward teeth to extend between positions inward from respective side surfaces of the clutch rearward teeth by a second predetermined distance in the circumferential direction, and side inclined surfaces are formed at the side surfaces of each of the clutch rearward teeth to extend from both end portions of the second contact surface in the circumferential direction to a position forward from the rear end position by a third predetermined distance in the direction of the axial line.

* * * * *